United States Patent [19]
Shackelford et al.

[11] Patent Number: 5,637,181
[45] Date of Patent: Jun. 10, 1997

[54] TOY FABRICATION DEVICE FOR DECORATIVE DISCS

[75] Inventors: Judith A. Shackelford, 615 N. Camden Dr., Beverly Hills, Calif. 90210; Paul Mulhauser, New York, N.Y.; Paul J. Kotowski, Foster, R.I.

[73] Assignee: Judith A. Shackelford, Beverly Hills, Calif.

[21] Appl. No.: 451,004

[22] Filed: May 25, 1995

[51] Int. Cl.$^6$ .............................. B32B 31/18; B32B 31/04
[52] U.S. Cl. ........................ 156/510; 156/515; 156/517; 156/530
[58] Field of Search .................................. 156/510, 515, 156/517, 530

[56] References Cited

U.S. PATENT DOCUMENTS

| | | | |
|---|---|---|---|
| 4,172,003 | 10/1979 | Bachelder et al. | 156/517 |
| 4,528,882 | 7/1985 | Axford et al. | 83/522 |
| 5,525,187 | 6/1996 | Pascal et al. | 156/515 |

*Primary Examiner*—Jill Warden
*Assistant Examiner*—Jan M. Ludlow
*Attorney, Agent, or Firm*—William Squire

[57] ABSTRACT

An index tray is pivoted in a housing, the tray having a recess for receiving a sticky coated disc and resiliently urged out of the housing for receiving the disc. An alignment detent device holds the tray in a retracted position in the housing cavity with the disc aligned at a predetermined location. A sheet of paper with pictorial or graphical indicia thereon is inserted into the cavity above the tray and disc. A transparent cylindrical press knob permits visual alignment of the indicia to the disc. Blades attached to the knob lower edge penetrate the sheet when the knob is depressed. A clamp coupled to the knob clamps the sheet to the tray in response to depressing the knob. After the knob is depressed, it is permitted to rotate in one direction only by a ratchet device to sever the sheet into a mating disc shape for attachment to the sticky surface of the disc on the tray. After the sheet is cut, the knob is lifted automatically and the tray, when released, springs open. An ejector mechanism on the tray ejects the completed decorative disc from the tray. An interlock precludes the blades from engaging the tray before the tray is placed in the cutting position.

32 Claims, 7 Drawing Sheets

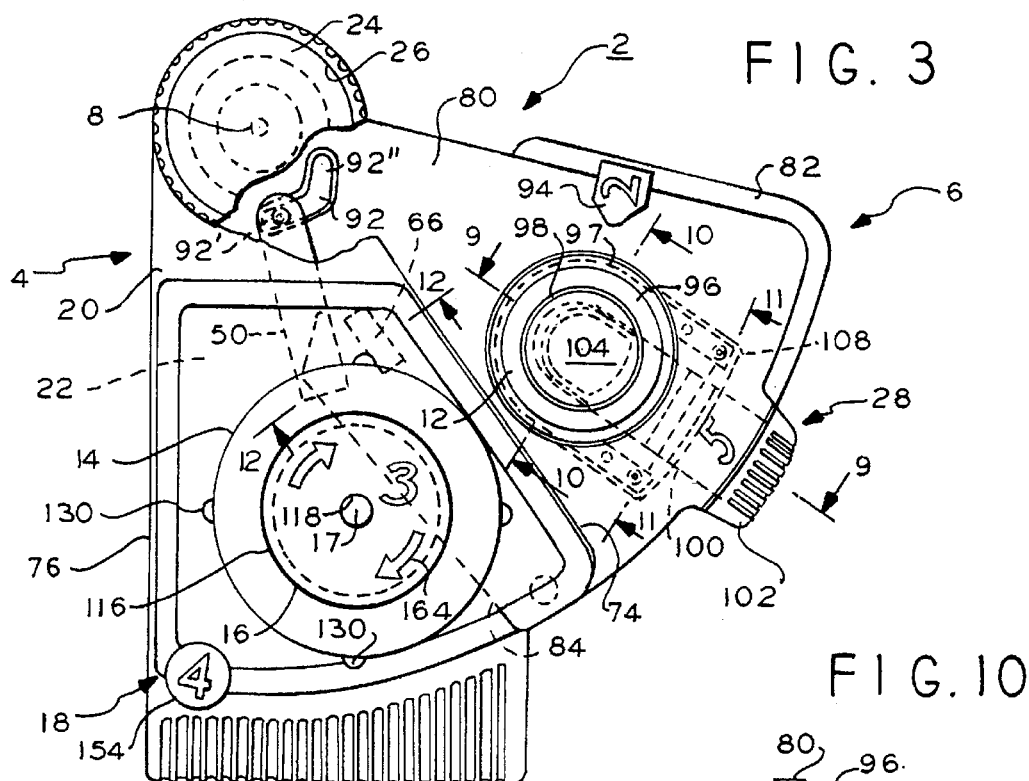
FIG. 3
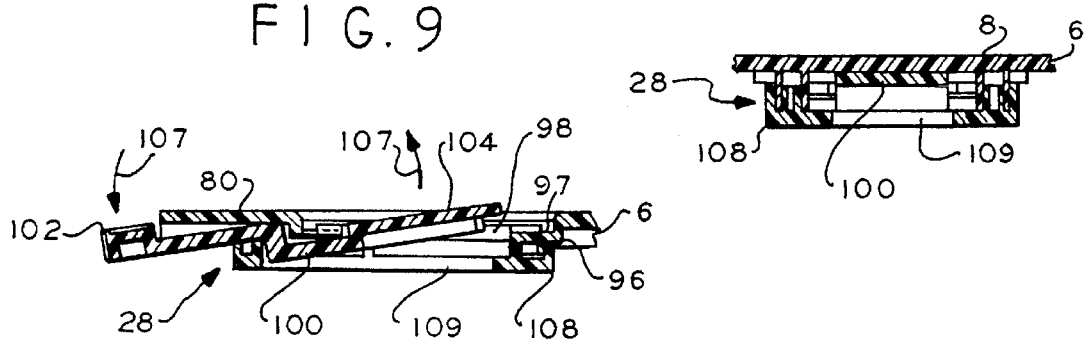
FIG. 10
FIG. 9
FIG. 11
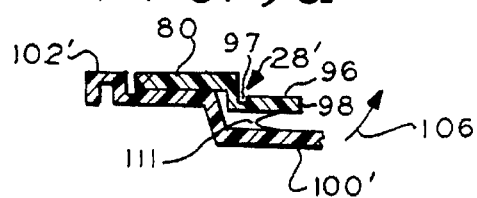
FIG. 9a
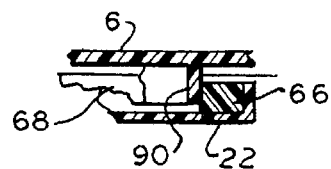
FIG. 12

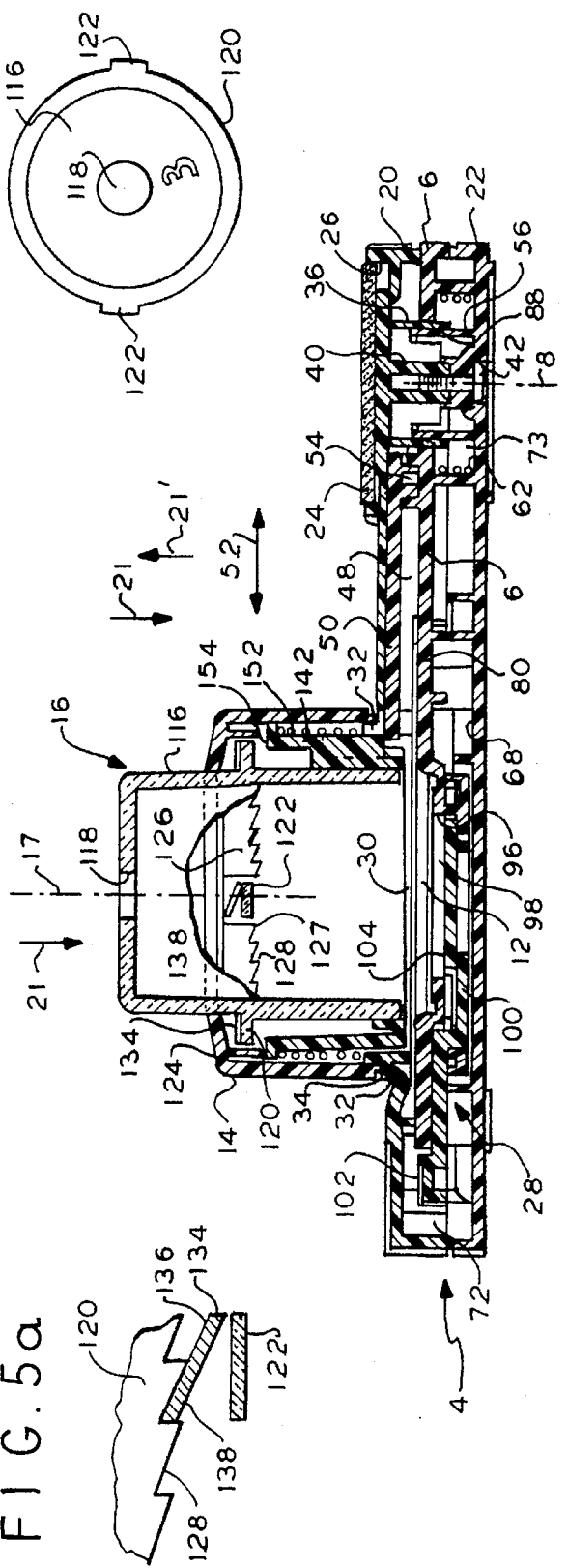

TOY FABRICATION DEVICE FOR DECORATIVE DISCS

This invention relates to a toy device for fabricating decorative discs.

Decorative discs are thin circular discs, typically paperboard or other substrate material, having pictorial or graphic decorative indicia on a surface thereof. The discs are of interest to children and may be used in a variety of children's or other games. They may be used, for example, as tokens or chips in some games. The decorative indicia is colorful and represent collectable items of interest. In past years, decorative discs were provided as seals in milk bottle tops and the like. Certain of such discs are presently available under the trademark POG owned by the World POG Federation. The designs employed on the discs are imaginative and cover a wide range of decorative concepts.

The present inventors recognize a need for a device with which children may safely fabricate their own decorative discs. In this context, children may utilize such a device to place unique designs on a disc. It is also recognized that there is a need for the creation of such decorative discs using conventional or personally created graphic material and means for assembling the graphic material to the substrate disc to create unique discs.

A toy decorative disc fabrication device according to the present invention comprises first means for receiving a disc; second means coupled to the first means for enabling the visual observation of alignment of decorative indicia on a sheet to the disc; and third means for severing the aligned sheet about the indicia substantially to the same peripheral dimensions as the disc.

In one embodiment, bonding means are on the disc for attaching the severed sheet to the disc during the severing.

In a further embodiment, the means for receiving the disc comprises a tray rotatably secured to a housing for securing the disc at a predetermined location within the housing, and the means for aligning includes transparent window means coupled to the housing for enabling visual observation of the predetermined location.

In a further embodiment, a toy decorative disc fabrication device comprises first means for releaseably receiving and locating a circular disc of a given diameter and surface area at a predetermined location. The first means is for receiving a sheet with indicia on a surface thereof in overlying movable relation relative to the received disc at the predetermined location, the sheet surface having an area greater than that of the disc. Second means are coupled to the first means for providing visual observation of the sheet at the predetermined location to permit manual alignment of the indicia with the received disc. Third means are coupled to the first means for manually severing the aligned sheet while in the overlying relation.

In a further embodiment, a toy decorative disc fabrication device for creating a cut sheet with indicia for attachment to a disc substrate according to the present invention comprises first means for enabling the visual observation of alignment of decorative indicia on a sheet to a reference location manifesting the region of the disc. Second means sever the aligned sheet about the indicia substantially to the same peripheral dimensions as the disc.

BRIEF DESCRIPTION OF THE DRAWINGS

FIG. 3 is a plan view of the embodiment of the device of FIG. 1;

FIG. 5 is a sectional elevation view of the embodiment of FIG. 2 taken along lines 5—5;

FIG. 5a is a fragmented sectional elevation view of a portion of the ratchet mechanism coupling a rotatable press knob of FIG. 1 to a fixed collar;

FIG. 5b is a plan view of the press knob of the embodiment of FIG. 1;

FIG. 6 is a sectional elevation view of the embodiment of FIG. 2 taken along lines 6—6;

FIG. 9 is a sectional elevation view of the embodiment of FIG. 3 taken along lines 9—9 showing a decorative disc ejector mechanism;

FIG. 9a is a sectional fragmented view of an alternative embodiment of the mechanism of FIG. 9;

FIG. 10 is a sectional elevation view of the embodiment of FIG. 3 taken along lines 10—10 showing a portion of the decorative disc ejector mechanism;

FIG. 11 is a sectional elevation view of the embodiment of FIG. 3 taken along lines 11—11 showing a further portion of the decorative disc ejector mechanism;

FIG. 12 is a sectional elevation view of the embodiment of FIG. 3 taken along lines 12—12 showing a stop portion of the housing and tray;

In FIG. 1, decorative disc fabrication device 2 comprises a housing 4, an index tray 6 rotatably secured to housing 4 for rotation about axis 8 and for receiving a substrate disc 10 in a circular cylindrical recess 12, a collar 14 secured to the housing 4, a press knob assembly 16 and an index tray alignment device 18. The housing 4 has two halves comprising a cover 20 and a bottom 22. The tray 6 is located between the two halves of the housing and rotatable about axis 8. The press knob assembly 16 is used to sever graphical material from a sheet of paper or the like for placement on the disc. The sheet material with the graphic decorative indicia is placed in the housing over the tray 6 and the received disc 10. The assembly 16 is rotatable about axis 17 preferably in only one direction 19 after it is axially depressed along axis 17 in direction 21 for perforating the sheet material and performing the severing step. A decorative label 24 which may be decorative disc or "slammer" (a heavier type disc used in playing games) is attached to cover 20 in recess 26. A disc ejector mechanism 28 is attached to the index tray 6 for ejecting the completed decorative disc from the tray as will be described below in more detail.

In FIG. 5, the cover 20 has a bore 30 defined by a circular cylindrical upstanding rim 32 having a shoulder 34. The cover 20 also has a circular cylindrical depending sleeve 36 concentric on axis 8 at the apex region of the cover. In FIG. 6, a hollow circular cylindrical boss 38 upstands from the upper surface of the cover 20 concentric with axis 8. A hollow cylindrical boss 40 depends from the cover 20 concentric with axis 8 for receiving screw 42. Screw 42 attaches the housing bottom 22 to the cover 20 via boss 40. Other screws 44 also attach the bottom 22 to cover 20 bosses through housing bottom 22 holes 46 (FIG. 4b).

Figure 1:
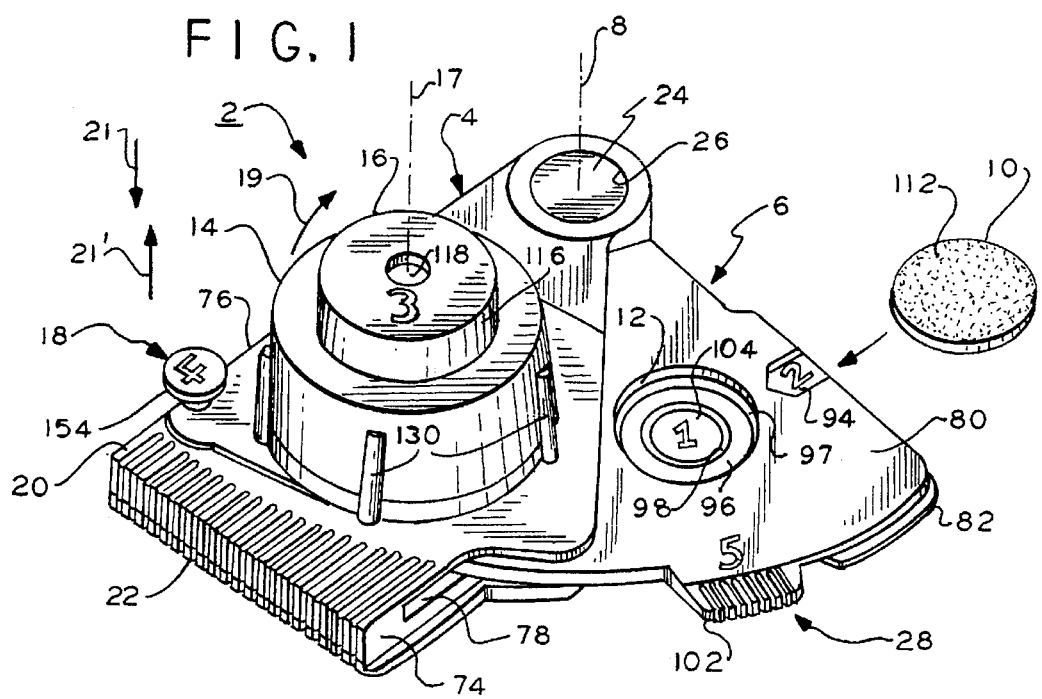
FIG. 1 is an isometric view of a decorative disc fabrication device according to an embodiment of the present invention in the initial stage of fabrication of a decorative disc.

The cover 20 has a linear channel 48 formed on its undersurface and which extends between and toward axes 8 and 17. An interlock bar 50 slides in the channel 48 in directions 52. As best seen in FIGS. 5b and 14b, the interlock bar has a depending projection 54. The interlock bar 50 is elongated and rectangular in section with the projection 54 located at one end of the bar nearest axis 8.

The housing 4 bottom 22, which is generally triangular in plan view and generally of the same shape as the cover, has an upstanding circular cylindrical sleeve 56, FIGS. 5, 6 and 14b, concentric with axis 8. Sleeve 56 fits within and abuts the cover sleeve 36. The housing bottom 22, FIGS. 4b and 14b, also has a circular groove 56 and a linear groove 60 in communication with groove 58 to receive torsion spring 62. Groove 60 receives one leg 64 of the spring 62. The housing cover 20 and bottom 22 are secured in fixed relative relation to each other. A rubber bumper 66, FIGS. 6 and 12, is attached to the housing bottom 22 in arcuate channel 68. A second arcuate channel 70 is also formed in the bottom 22.

The housing bottom 22 and cover 20 form a cavity 72 therebetween. This cavity 72 is somewhat flat and is in communication with the opposite sides 74 and 76 of the housing 4 via openings 78 (only one being shown, FIG. 1). Openings 78 are sufficiently small such that the fingers of a child cannot be inserted within the cavity 72 for safety purposes to be explained below.

Figure 2:
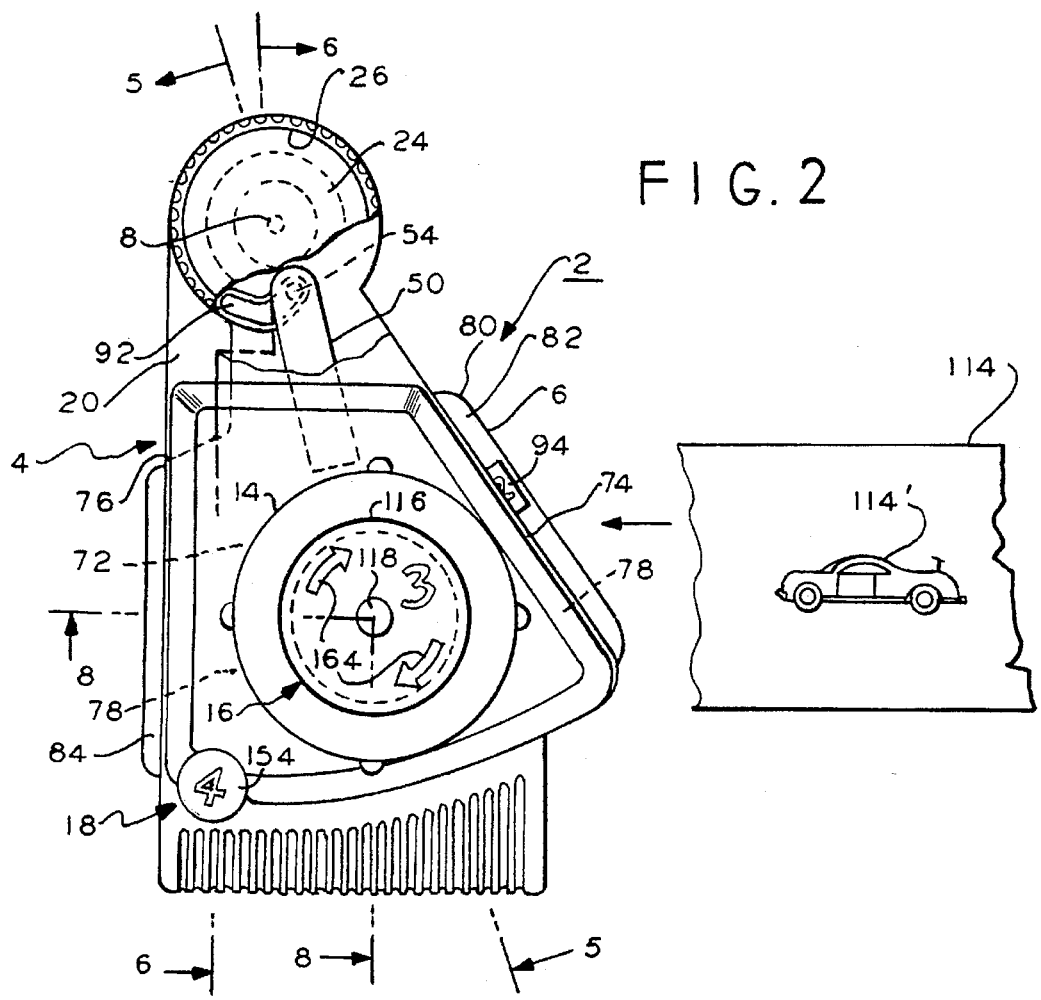
FIG. 2 is a plan view of the device of FIG. 1 in a second stage of fabrication of the decorative disc.
Figure 4A:
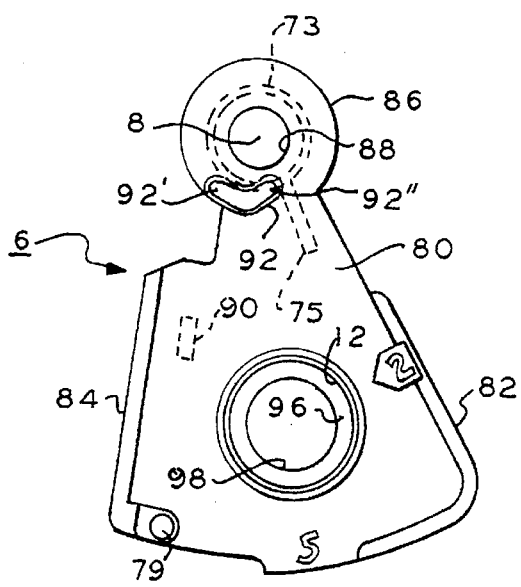
FIG. 4a is a plan view of an index tray used in the embodiment of FIG. 1.

Index tray 6 is rotatably secured to housing 4 in the cavity 72, FIGS. 1, 2 and 3 for rotation about axis 8 from the extended position of FIGS. 1 and 3 to the retracted closed position of FIG. 2. The tray 6, FIGS. 1, 4a, 5 and 6, comprises a somewhat triangular shaped platform 80 of similar shape as the housing 4 and two flanges 82 and 84 on opposing edges. In FIG. 4a, the tray 6 platform 80 is formed with a circular member 86 at the apex in the region of axis 8. Member 86 is the same shape as the housing 4 cover and bottom in this region. A circular cylindrical bore 88 is formed in member 86 concentric with axis 8. Bore 88 receives the sleeve 36, FIGS. 5 and 14b, of the cover 20 in abutting rotatable sliding engagement for rotation about axis 8. The sleeve 36 and bore 88 thus form a bearing and journal arrangement for the tray 6.

A projection 90, FIGS. 6 and 12, depends from platform 80 into bottom 22 channel 68. When the tray 6 is in the extended position of FIG. 3, the projection 90 engages the bumper 66 to limit the travel of the tray to the extended position shown.

An arcuate channel 92 is formed on the upper surface of the platform 80, FIG. 4a. The channel 92 has a circumferential portion 92' and a second portion 92" which extends radially inwardly somewhat towards axis 8 and circumferentially about axis 8. When the tray is in the extended position of FIG. 3, the channel portion 92' is relatively close to the axis 17 as compared to channel portion 92". Channel portion 92" extends relatively further away from axis 17, as compared to portion 92', closer to axis 8 when the tray 6 is in the retracted position of FIG. 2.

Projection 54 of interlock bar 50 is in the channel 92. As the tray is rotated between its retracted and extended positions, the bar 50 is displaced in the directions 52 by the engagement of projection 54 with the channel 92. In the tray 6 position shown FIG. 3, the bar 50, shown in phantom, is in its forwardmost position closest to the axis 17. In the tray positon of FIG. 2, the bar 50 is in its rearwardmost position as shown in phantom. Thus the bar 50 is automatically moved forward and rearward as the tray is rotated from its two extreme positions within and external the housing cavity 72. The interlock action of the bar 50 will be described below.

Figure 4B:
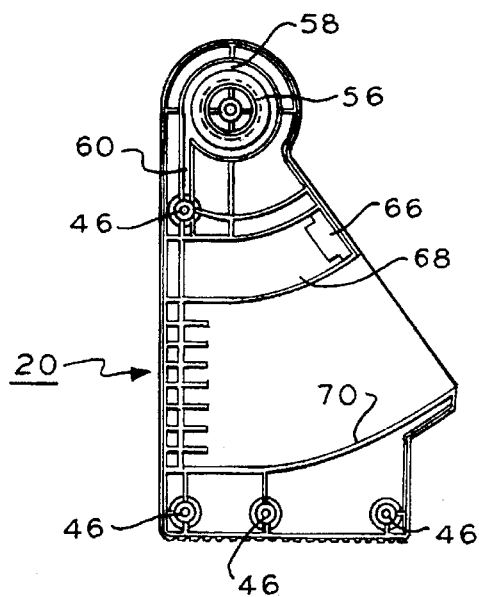
FIG. 4b is a plan view of the bottom portion of the housing of the embodiment of FIG. 1.

A circular channel 73, FIGS. 4a, 5 and 6, is formed in the underside of the platform 80 to receive torsion spring 62 in cooperation with channel 56 of the housing bottom 22, FIG. 4b. A second linear channel 75, FIG. 4a, receives a leg 77 of the spring 62 (FIG. 14b). The channels 60 and 75 are oriented so that the spring 62 urges the tray 6 into the extended position of FIGS. 1 and 3. When the tray is closed to the retracted position of FIG. 2, the spring 62 is under compression and will tend to move the tray to the extended positon unless the tray is otherwise secured in place.

An aperture 79 in the platform 80, FIG. 4a, receives the alignment device 18 for this purpose, aligning and holding the tray 6 in the retracted position, the device 18 to be described below.

The tray platform 80 and flange 82, FIG. 4a, has an arrow shaped recess 94 in which indicia numeral 2 is located. This number represents the step sequence in which the decorative disc is to be fabricated in using the device 2. The arrow indicates that step 2 in the process is moving the tray to the retracted positon of FIG. 2. Step 1 is placement of the disc 10, FIG. 1, in the recess 12 of the tray 6. The numeral 1 is embedded in the ejector mechanism 28 ejector pad 104 to be described.

An annular flange 96 forms the base of the recess 12 in the platform 80 of tray 6. Flange 96 forms a bore 98. A circular groove 97, FIG. 10, is formed in the outer surface of the flange 96. When the bore 98 is positioned in the retracted position of FIG. 2, its center is aligned substantially on the axis 17 by alignment device 18.

Figure 13:
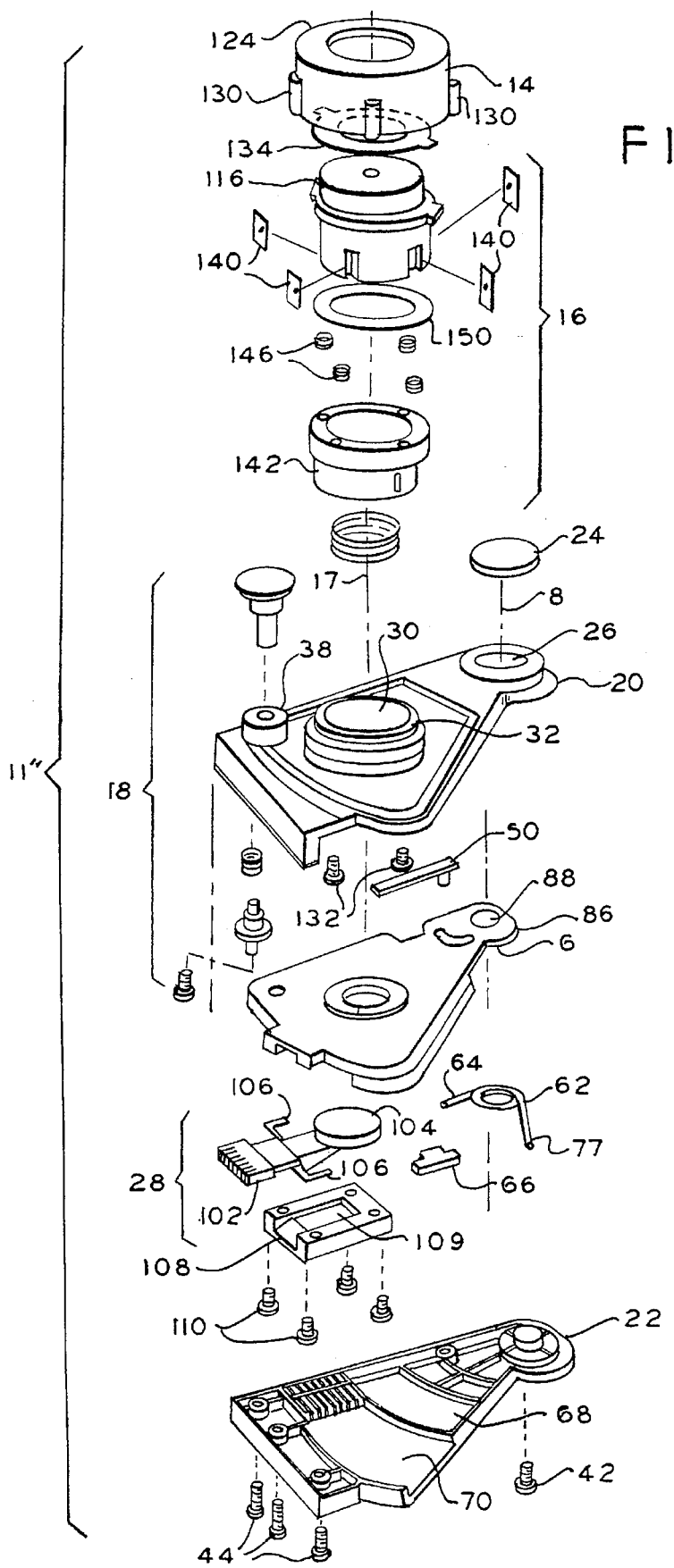
FIG. 13 is an exploded view of the embodiment of FIG. 2.

Decorative disc ejector mechanism 28, FIGS. 5, 9, 10 and 11, comprises a lever 100 having a push tab 102 and an ejector pad 104. The lever 100, and other components including the housing and tray, are preferably molded thermoplastic material. A pair of oppositely positioned springs 106, FIG. 13, molded integral with the lever 100 cooperate to keep the lever 100 in the neutral position, FIGS. 1, 5, where the pad 104 is beneath the plane of flange 96 but parallel thereto. The lever 100 pivots to the position shown in FIG. 9 when the tab 102 is pushed in direction 107. A housing 108, FIGS. 13 and 14b, having a central opening 109, secures the lever 100 to the underside of the platform 80 via screws 110.

In the alternative, in FIG. 9a, a V-shaped spring 111 is between the lever 100' and tray 6 to urge the lever 100 to the neutral position of FIGS. 2 and 3. In either embodiment, the levers pivot about the housing 108 when pushed downward at the tab 102 in direction 107.

In FIG. 1, the disc 10 forming the decorative disc substrate preferably has a sticky adhesive coating 112. The disc 10 is inserted into the recess 12 in the tray 6 where it is snugly fitted with the coating 112 recessed below and parallel to the plane of the platform 80 surface. At this time the tray is retracted to the position of FIG. 2. In the next stage of fabrication of the decorative disc, a graphically decorated sheet 114, paper or other suitable material, e.g., an automobile 114 or with any other decoration according to the imagination of the user, is inserted into the cavity 72 of the housing 4 via opening 78.

The sheet may protrude from the cavity 72 through the openings 78 on either side of the housing 4. When protruding, the sheet 114 is available for manipulation by the user to align the indicia thereon to the axis 17 as will be described. The sheet 114 does not stick to the coating 112 on the disc 10 because the disc is recessed below the surface of the tray 6 platform 80.

The problem now addressed is to form the sheet 114 into a suitable circular disc for attachment to the sticky coating 112 of the disc. The severing of a circular portion of the sheet 114 to substantially the same size and shape as disc 10 is performed by the collar 14 and the press knob assembly 16.

In FIGS. 5–8, the press knob assembly 16 comprises a press knob 116. Knob 116 is transparent molded thermoplastic in this embodiment, and is circular cylindrical with a central hole 118 in the top portion. The knob 116 has an outwardly radially extending flange 120. In FIG. 5b, a pair of diametrically opposite tabs 122 extend radially outwardly from flange 120. The flange 120 is approximately medially along the axial length of the knob 116, axis 17. The knob 116 is axially displaceable within and relative to collar 14.

Collar 14 comprises an opaque cylindrical inverted cup-like member having a radially inwardly upper extending flange 124 forming a top of the collar. The flange 124 has a bore which closely slidable and rotatably receives the knob 116. The knob 116 abuts the collar flange 124 in the region between the flange 120 and the top of the knob with hole 118. The collar 116 has an internal annular rib 126 depending in direction 21. The rib 126 has two diametrically opposite axially extending recesses 127 (one being shown in FIG. 5) for selectively receiving the tabs 122 of the knob 116 in the axial direction along axis 17. The underside edge of the rib 126 has an annular array of coplanar like ratchet teeth 128 interrupted by two diametrically opposite recesses 127. The collar 14 has four axially extending bosses 130 for receiving screws 132. Screws 132 secure the collar 14 to the cover 20 shoulder 34, FIG. 5.

Figure 7:
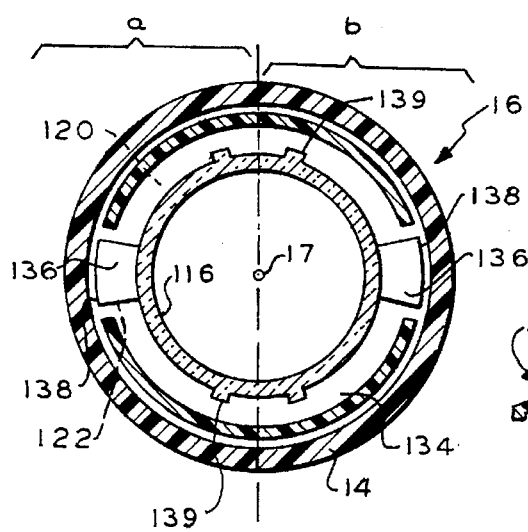
FIG. 7 is a sectional fragmented elevation view of the embodiment of FIG. 8 taken along lines 7—7 showing two different axial positions of the press knob in an upper position in an initial quiescent stage before severing the decorative sheet on the right hand side of the FIG. and in a downward depressed sheet severing second stage position on the left hand side of the FIG.

An annular washer-like thermoplastic or metal ratchet spring 134 overlies the knob 116 flange 120. In FIG. 7, the spring 134 is planar except for two oppositely disposed inclined ratchet teeth 136. The ratchet teeth 136 project beyond the periphery of the remainder of the spring 134 at portions 138 and overlie the tabs 122, FIG. 5b, of the knob 116. The tabs 122 and the portions 138 have an outer diameter about the same as the outer diameter of rib 126 of the collar 14. The spring 134 is secured to the knob 116 by projections 139 spaced from flange 120. The spring has notches (not shown) which align with the projections 139 to assist in assembling the spring 134 over the projections into the interface with the flange 120. The spring 134 is spaced somewhat above the flange 120 by further projections (not shown) to provide a clearance (not shown) between the spring 134 and flange 120.

As a result, the tabs 122 and overlying ratchet teeth 136 portions 138 must engage the recesses 127 in the rib 120 in order for the knob 116 to be displaced to its uppermost axially position of FIG. 5. A clearance (not shown) is provided between the spring 134 and the ratchet teeth 128 of rib 120 to allow for tolerances in blade penetration of the sheet 114 in a manner to be described. When the knob 116 is depressed in direction 21, FIG. 5, the tabs 122 and ratchet teeth 136 are displaced toward the housing 4 in direction 21 parallel to axis 17 until they are beneath the plane of the rib 120 lower edge ratchet teeth 128.

At this time the knob is permitted to be rotated in only one direction, the direction of the arrows on the knob 116, FIG. 3, by the spring 134 and rib 120 ratchet teeth 128 which become engaged at this time. The tabs 122 and ratchet teeth 136 portions 138 after rotation are beneath, aligned with and engaged with the lower edge of the rib 126 teeth 128.

Figure 8:
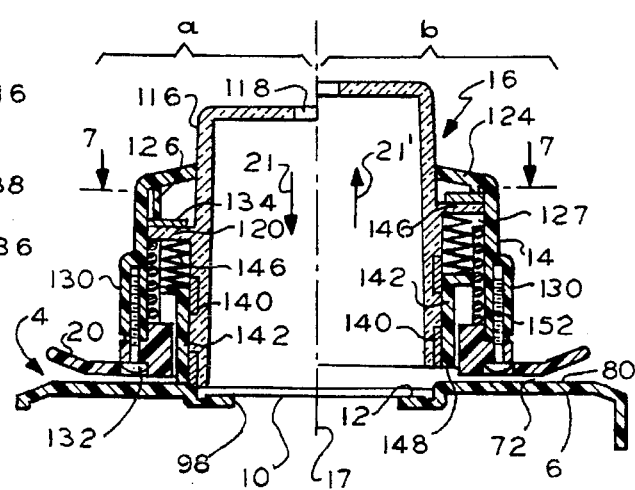
FIG. 8 is a sectional elevation view of the embodiment of FIG. 2 taken along lines 8—8 showing two different axial positions of the press knob in an initial stage before severing the decorative sheet on the right hand side of the FIG. and in a sheet severing second stage on the left hand side of the FIG.

In FIG. 8, a set of four blades 140 (only two being shown in FIG. 8) are secured to the knob 116 and project beyond the knob lower edge 0.010–0.020 inches for cutting the sheet 114. Each blade 140 has an inclined cutting edge facing in the same direction when attached to the knob 116. The blades 140 are heat staked to the knob 116 but could attached by screws and the like.

The blades are thus attached in 90° spaced apart increments whereas the knob 116 must rotate 180° in order to be displaced upwardly in direction 21' opposite direction 21 to the quiescent position of FIG. 5 and FIG. 8, right hand side, from the lower active cutting position, left hand side of FIG. 8. This insures the sheet 114 is completely severed. The knob 116 is kept in the lower position (left side FIG. 8) by the engagement of the ratchet spring 134 and flange 120 tabs 122 of the knob with the rib 126 of the collar 14. The blades 140 may be received in groove 97 of flange 96, FIG. 10, of tray 6, depending upon the thickness of the disc 10. The blades my be of the type that are commercially available under the trademark X-Acto. The blades are sufficiently sharp to sever the sheet 114 if desired without the support of a disc 10 while the sheet is clamped.

Figure 14A:
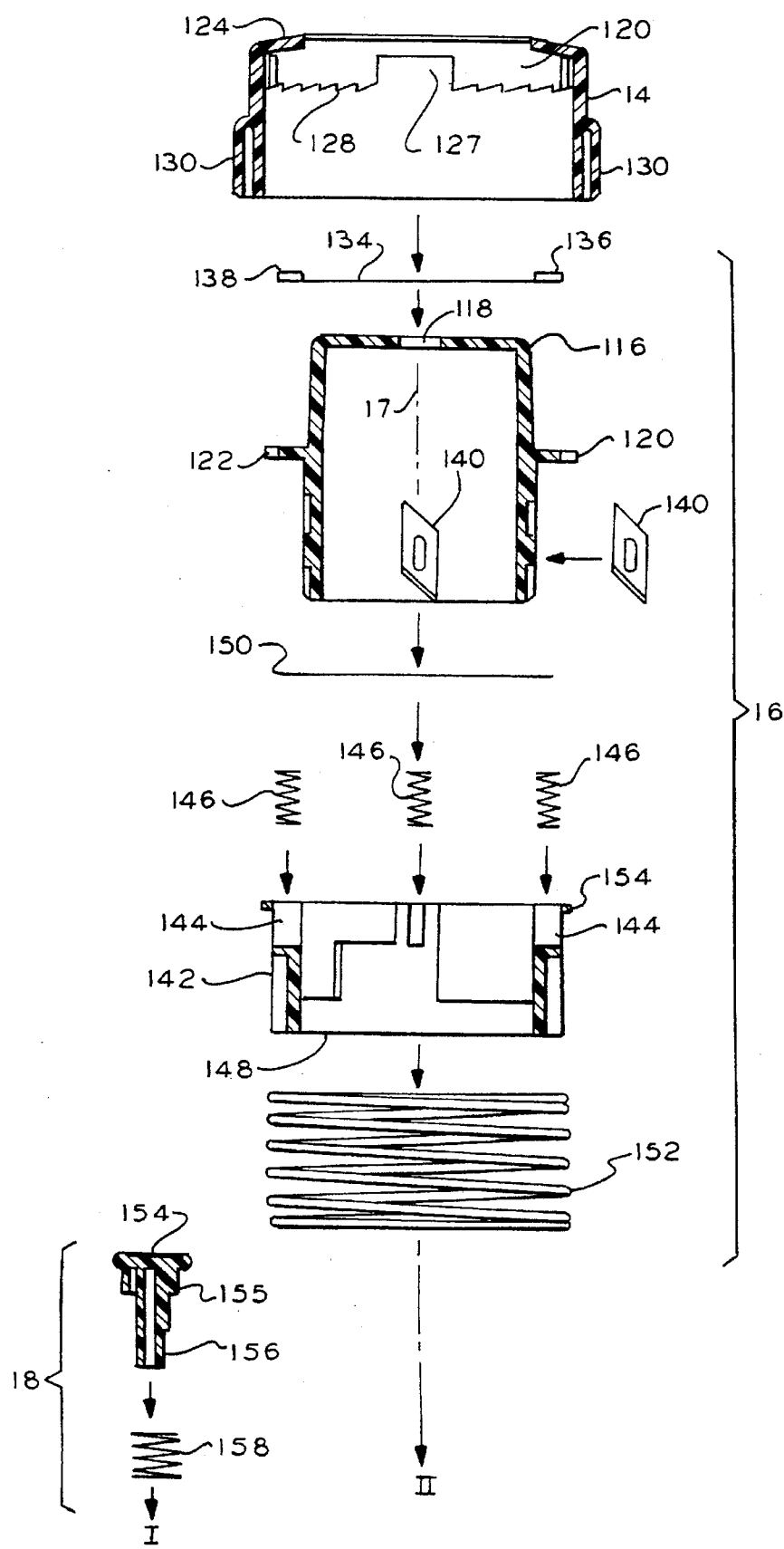
FIGS. 14a and 14b are exploded sectional views of the embodiment of FIG. 2.
Figure 14B:
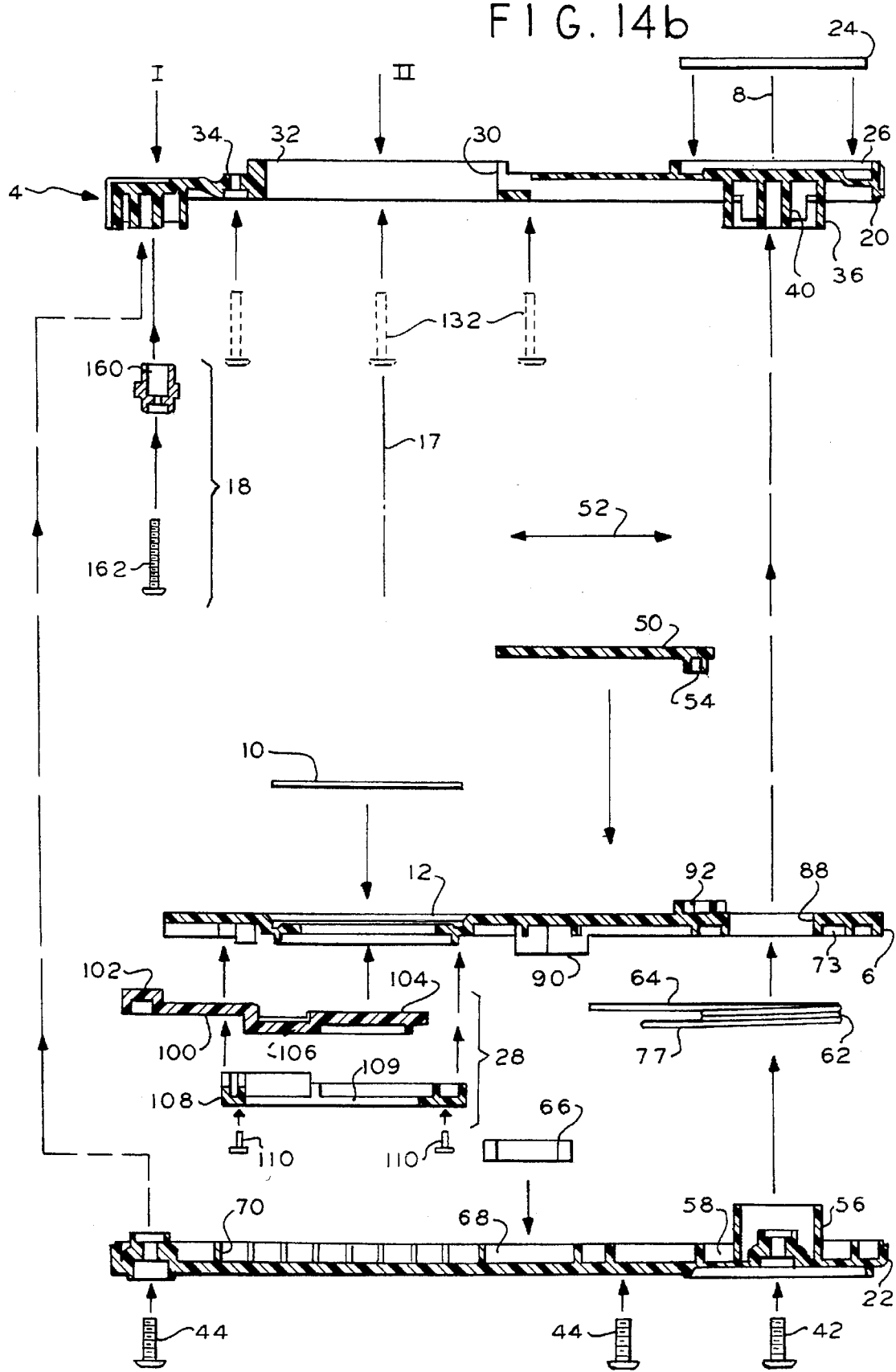

In FIGS. 5, 8 and 14a, a generally circular cylindrical clamp 142 is between the knob 116 and collar 14. The clamp 142 has four equally spaced cylindrical recesses 144 for receiving four mating compression springs 146. The clamp 142 has a lower edge 148 lying in a plane which serves to clamp the decorative sheet 114 (FIG. 2) to the upper surface of the tray 6 platform 80 as shown in the left hand side of FIG. 8 (the sheet 114 and ejector pad 104 not being shown in FIG. 8 for simplicity of illustration). The springs 146 urge the clamp resiliently against the sheet 114 in the clamp mode when the knob 116 is axially displaced to the sheet 114 cutting position of FIG. 8, left hand side. The clamp 142 is keyed to the collar 14 in the axial direction 21 (by keys not shown) to preclude the clamp from rotating as the knob 116 is rotated.

A flat ring-like metal washer 150, FIG. 14a, is between the springs 146 and upper edge of the clamp 142 and the lower surface of the knob flange 120. The washer serves as an interface to preclude the metal springs 146 from damaging the softer thermoplastic knob flange 120 as the knob 116 is rotated.

An outer coil spring 152 engages the cover 20 rim 32, FIG. 5, and flange 154 of the clamp 142. Spring 152 is weaker than springs 146 for urging the clamp 142 upwardly in direction 21' against the collar 14 rib 126. The flange 120 of the knob engages the flange 154 of the clamp via the washer 150 when the knob is depressed in direction 21. The spring 152 thus also urges the knob 116 upwardly in direction 21'. The springs 146 also urge the knob upwardly in direction 21' to force the knob 116 into its uppermost position of FIG. 5 when the tabs 122 and recesses 127 are aligned axially.

Additional structure may be provided to enhance the clamping action, if desired, of the clamp 142 against the sheet 114. For example, the clamp being preferably molded thermoplastic may be provided a roughened surface at the clamping edge. Also, other material such as a metal element (not shown) may also be provided to provide an interface between the sheet 114 and clamp 142 to enhance the clamp gripping action.

In FIGS. 6, 14a and 14b, the alignment device 18 comprises a head 154 from which depends a shank 155, a hollow shaft 156 of smaller diameter than the shank 155, a coil compression spring 158, a detent member 160 and a screw 162 which attaches to the core of the shaft 156. The head 154, shank 155 and shaft 156 are located on the boss 38, FIG. 6. The shank rests on the upper edge of the boss 38 and the shaft is inserted in the bore of the boss 38. The spring 158 and detent member 160 are inserted into the bore of the boss 38 from below the cover 20 and screwed to the boss 38 by screw 162. The detent member 160 has a somewhat rounded lower surface and is normally urged downward in direction 21 by spring 158. The head 154 and detent member 160 are axially resiliently movably in the bore of the boss 38 in direction 21' by lifting the head 154. The detent member 160 is a cylinder which depends from the cover and engages the aperture 79 (FIG. 4a) in index tray 6 when the aperture is aligned therewith. In this position the tray 6 is in the retracted position, FIG. 2. This action aligns the press knob assembly 16, FIG. 5, with the recess 12 in the tray 6 aligned on axis 17. The pivot axis 8 of the tray 6 relative to the housing 4 aligns the position of the tray 6 recess 12 to axis 17 in combination with the alignment device 18.

The torsion spring 62 at this time is compressed and urges the tray 6 toward its extended position, FIG. 1. However, the tray 6 is restrained in the retracted position of FIG. 2 by the alignment device 18. By lifting the head 154 and disengaging the detent member 160 from the aperture 79 in the tray 6, the torsion spring 62 automatically swings the tray to the open extended position of FIG. 1.

In operation, the decorative disc fabrication device 2 is normally stored in the quiescent position with the tray 6 in the retracted position of FIG. 2. In this position the interlock bar 50 is in the position of FIG. 5. To fabricate a decorative disc, the head 154 of device 18 is lifted in direction 21', FIG. 1. The tray 6 then automatically springs out of housing 4 cavity 72 via opening 78 to the position shown. At this time the interlock bar 50 automatically moves toward axis 17 to the positon of FIG. 3. In this position the bar 50 is beneath the clamp 142 and prevents the knob 116 and clamp from being axially depressed toward the tray 6. This prevents the blades from being fully depressed to their cutting position of FIG. 8., left side, to preclude damaging the tray when it is returned to the retracted position of FIG. 2.

A disc 10 with sticky coating 112 facing in direction 21' is separated from a master sheet (not shown). The discs can be provided on such a master sheet, typically a stiff paper board substrate, with the sticky coating protected by glossy paper in a known manner. The reference numeral 1 on the ejector pad 104 indicates this is step 1.

The next step is indicated by the arrow recess 94 with the reference numeral 2. This indicates that the tray 6 should be closed to the retracted position of FIG. 2. The next step is to insert sheet 114, FIG. 2, with the decorative indicia thereon. Such a sheet can be any sheet paper material with indicia thereon as desired. Such decorative indicia may be cut from magazines, newspapers, or created by the user or others on plain paper sheets, for example. The decorative sheet is then inserted into the cavity 72 via opening 78. The sheet may be passed completely through the cavity 72 and passed out the other opening 78 (not shown) on the opposite side 76 of the housing 4. The sheet 114 is sufficiently large so that at least one portion extends from the housing 4. This portion is to be grasped by a user to manually align the selected region of the indicia on the axis 17 and inserted disc 10.

The user then visually peers through the press knob 116, FIG. 2, which enables the user to align the decorative indicia with the user's line of sight on axis 17. Hole 118 not provided for this purpose may be used nevertheless to assist in such alignment if desired. When the user is satisfied that the indicia 114', FIG. 2, is centered and aligned, the press knob 116 is then pressed downwardly in direction 21, FIG. 8, from the position on the right hand side of the figure to that of the left hand side.

As the knob 116 is depressed, the tabs 122 and ratchet teeth 138 on the ratchet spring 134, FIG. 5, are axially displaced in direction 21 until they disengage the recess 127 in the collar 14 rib 126. At this time the tabs 122 and ratchet teeth 136 portions 138 can be rotated beneath the lower saw tooth edge of the rib 126. The knob 116 is rotated in the directions of arrows 164 embossed on the knob 116, FIG. 2. The numeral 3 on the knob 116 indicates that the above is step 3 in the decorative disc fabrication process.

When the knob 116 is depressed, its flange 120 via metal washer 150 (FIG. 14a) resiliently displaces the clamp 142 in direction 21' until the clamp 142 engages and clamps the sheet 114 against the platform 80 of the tray 6, FIG. 8, left side. The knob 116 is further displaced in direction 21 until the blades 140 projecting beneath the knob 116 penetrate the sheet 114, FIG. 8. At this time the knob 116 is free to rotate in direction of arrows 164, FIG. 2.

The knob must be rotated one half turn before the tabs 122 and ratchet teeth 136 portions 138 of the ratchet spring 134 are aligned with recesses 127. Since the blades are positioned in one quarter turn locations, the half turn insures that the sheet is fully severed by the blades 140. Once the tabs 122 and ratchet teeth align with the recesses 127, the springs 146 and 152 urge the knob 116 upwardly into the position of FIG. 8, right hand side, direction 21'. The stronger springs 146 provide enhanced clamping action of the clamp against the sheet 114. The weaker spring 152 provides sufficient force to provide the desired lifting action of the knob when the cutting of the sheet 114 is completed.

The head 154 of the alignment device 18 is then lifted and the tray 6 pops to the open extended position of FIG. 1. The numeral 4 on the head 154 indicates this is the next step in the process. The next step is indicated by the numeral 5 on the tray 6 next to the tab 102 of the ejector mechanism 28. The tab 102 is snapped in direction 21 to pivot lever 100 causing the pad 104 to flip the completed decorative disc from the tray 6 recess 112.

Should it occur that the user may inadvertantly omit insertion of the sheet 114 of indicia, or the sheet 114 does not fully cover the sticky blank disc 10, the disc 10 may adhere to the bottom of the press knob 116 when the knob is depressed. Therefore, a hole 118 is provided through the press knob 116 aligned with the disc 10. A stick or pencil (not shown) may be inserted through the hole 118 to urge the blank disc 10 away from and disengage it from the press knob and urge the disc into its recess 12 in the tray 6.

While a single edge blade 140 is illustrated for use in a single direction of rotation of knob 116, a double edged blade (not shown) may also be used. In this case, the ratchet mechanism comprising the ratchet spring 134 and the ratchet teeth on the lower edge of the flange 120 are not needed. The knob 116 may be rotated in either of two opposite directions to effect the cutting of the sheet 114 with the double edged blades. Single edge blades are preferable because of lower cost. As mentioned, the openings 78 are sufficiently small to prevent a small child from inserting a finger into the cavity. This prevents the finger from contacting the blades 140, which are relatively sharp edged.

It will occur to one of ordinary skill that various modifications may be made to the disclosed device which is given byway of illustration and not limitation. While a clamp is preferred it will occur that the user may hold the sheet in place where it protrudes through openings 78. This manually holds the sheet external the housing 4 during the cutting action. Also, while in the disclosed embodiment, the sheet of indicia is severed in overlying relation to the received disc, it will occur that the sheet of indicia can be severed without a disc in place. The severed sheet can then be manually bonded to a disc separate from the fabrication device 2. It is intended that the invention is as defined in the appended claims.

What is claimed is:

1. A toy decorative disc fabrication device comprising:
   first means including:
   a housing having a plurality of side walls, a top and bottom wall, all said walls defining a cavity of fixed volume in said housing, one of said side walls having an opening therethrough, said cavity being in communication with ambient atmosphere through said opening; and
   a tray rotatably secured to the housing for rotation about an axis normal to said top and bottom walls for selective displacement into and out of the cavity from the ambient atmosphere through said opening, said housing and tray being arranged for releasably receiving and locating a circular disc of a given diameter and surface area at a predetermined location in said cavity, said housing and tray being arranged for receiving a sheet with indicia on a surface thereof in overlying movable relation relative to the received disc at said predetermined location, said sheet surface having an area greater than that of the disc;
   second means coupled to the first means for enabling visual observation of the sheet at said predetermined location to permit manual alignment of the indicia with said received disc; and
   third means coupled to the first means for manually severing the aligned sheet while in said overlying relation.

2. The device of claim 1 wherein the second means comprises a transparent displaceable knob and including further means coupled to the third means for operating the third means in response to manual displacement of the knob.

3. The device of claim 1 wherein said tray has a broad surface defining a plane, said tray having a recess in said broad surface for receiving said disc, said recess having a depth such that said disc is spaced from the plane.

4. The device of claim 2 including a clamp movably secured to the housing and responsive to displacement of the knob for clamping the sheet to the housing prior to said severing.

5. The device of claim 4 wherein the third means includes ratchet means coupled to the housing and knob for permitting only one way rotation of the knob.

6. A toy decorative disc fabrication device comprising:
   a housing having a cavity and an opening in communication with the cavity and ambient atmosphere;
   first means including a tray movably secured to the housing for releasably receiving a disc of a given diameter and surface area in a region located in said ambient atmosphere spaced from said cavity and said opening, said tray and housing being arranged for locating the disc on an axis at a predetermined location relative to the housing in said cavity;
   said opening in said housing being arranged for receiving a sheet with indicia thereon in overlying movable relation relative to the received disc at said predetermined location in said cavity, said sheet having a broad surface area greater than that of the disc;
   second means secured to the housing for permitting visual observation of the received disc and the indicia on said received sheet along said axis and for permitting alignment of the indicia with the means for receiving the disc at said predetermined location; and
   third means secured to the housing for severing the sheet about said aligned indicia.

7. The device of claim 6 wherein said tray has a broad surface defining a plane, said tray having a recess in said broad surface for receiving said disc, said recess having a depth such that said disc is spaced from the plane.

8. The device of claim 6 wherein the second means comprises a transparent knob aligned with said axis for enabling visual observation of said predetermined location.

9. The device of claim 6 wherein said predetermined location lies on said axis substantially at the center of said received disc, said third means including at least one blade rotatably secured to the housing for rotation about said axis and having a cutting radius substantially the same as the radius of said received disc.

10. The device of claim 9 wherein the third means includes clamp means for selectively clamping the aligned sheet during said cutting.

11. The device of claim 10 wherein the second means comprises a displaceable transparent knob aligned on said axis, said third means including means coupled to the knob for operating said clamp means and said at least one blade in response to displacement of the knob.

12. The device of claim 11 wherein the tray has first and second positions, the first position for receiving said disc external the housing, the second position for aligning the disc at said predetermined location within said housing, said device including lock means for selectively precluding substantial displacement of said knob, said clamp means and said at least one blade when the tray is in the first position.

13. The device of claim 12 wherein the lock means comprises means responsive to the displacement of the tray from and to the first and second positions.

14. The device of claim 11 wherein the knob has a first quiescent axial fixed position and at least one second active axial position in which the knob is rotatable about said axis, the second means including means for permitting manual axially displacing of the knob along said axis in only at least one angular position about said axis from and to the first and the at least one second positions, said second means including means such that the knob is rotatable about said axis only when in the at least one second active position.

15. The device of claim 14 wherein the knob comprises a cylinder having proximal and distal ends, at least one blade secured to the knob distal end and projecting beyond said end, said third means comprising an annular collar secured to the housing and surrounding the knob, said collar including an annular inner depending ring member having an axially extending recess in at least one angular position relative to said axis, a radially outwardly extending projection on said knob for selectively engaging said recess and said ring member, said clamp comprising an axially displaceable cylinder between said collar and knob for selectively clamping said sheet to said first means, and means for resiliently coupling the clamp to said knob for axially displacing the clamp in response to axial displacement of knob.

16. The device of claim 7 including sheet bonding means on said disc for bonding the severed sheet to said disc to form said decorative disc while in said predetermined location.

17. The device of claim 16 including eject means coupled to the first means for ejecting the decorative disc from the first means.

18. A toy decorative disc fabrication device comprising:
a housing having a cavity and an opening in communication with the cavity and ambient atmosphere;
a tray rotatably secured to the housing in said opening and cavity having a recess for releaseably receiving a disc of a given diameter defining a given radius and surface area, said tray for locating the disc on an axis at a predetermined location relative to the housing in said cavity;
said opening in said housing being arranged for receiving a sheet with indicia thereon in overlying movable relation relative to the predetermined location, said sheet having a broad surface area greater than that of the disc;
a transparent cylindrical knob secured to the housing for rotation about and displacement along said axis and for permitting visual observation of the received disc and sheet at said predetermined location; and
sheet cutting means secured to and depending from the knob for severing the received sheet about said axis at a radius substantially the same as the radius of said disc in response to axial displacement and rotation of said knob.

19. The device of claim 18 including a cylindrical clamp resiliently axially coupled to the housing and the knob and responsive to the axial displacement of the knob for axially clamping the sheet to the tray before and during said severing.

20. The device of claim 18 wherein the tray has a first position for receiving the disc external the housing and a second position for locating the disc at said predetermined location, said device including interlock means coupled to the housing and to the tray and responsive to the rotation of the tray for precluding the axial displacement of the knob when the tray is in said first position.

21. The device of claim 18 including lock means for releaseably locking the tray in said second positon.

22. The device of claim 18 including ratchet means coupled to the housing and to the knob for permitting only one way rotation of the knob about said axis.

23. The device of claim 19 including key means for precluding axial rotation of the clamp relative to said axis while permitting axial displacement of the clamp.

24. The device of claim 18 wherein the sheet cutting means includes a double edged blade for cutting the sheet in either of two opposite directions of rotation of the knob.

25. A toy decorative disc fabrication device comprising:
first means for receiving a disc on an axis normal to the disc;
second means coupled to the first means for enabling the visual observation of alignment of decorative indicia on a sheet to the disc; and
third means including axially and rotatably displaceable sheet severing means for severing the aligned sheet about said indicia by axial displacement along said axis and rotation about said axis;
said sheet being severed substantially to the same peripheral dimensions as said disc in response to the axial and rotatable displacement of said displaceable means.

26. The device of claim 25 including bonding means on said disc for attaching said severed sheet to said disc during said severing.

27. The device of claim 25 wherein the means for receiving the disc comprises a tray rotatably secured to a housing for securing the disc at a predetermined location within the housing, end the means for aligning includes transparent window means coupled to the housing for permitting visual observation of the predetermined location.

28. The device of claim 25 wherein the first means for receiving the disc comprises a housing having a cavity with an opening coupling the cavity to the ambient atmosphere and a tray secured to the housing for selective displacement into and out of said cavity from the ambient atmosphere.

29. A toy decorative disc fabrication device for creating a cut sheet with indicia for attachment to a disc of a given surface region and peripheral dimensions comprising:
first means including a housing defining a cavity having an axis, a tray displaceable into and out of said cavity from the ambient atmosphere in a plane normal to said axis and transparent means for enabling the visual observation of the alignment of decorative indicia on a sheet to a housing reference location at the axis and manifesting the surface region of the disc; and
second means coupled to the first means for severing the aligned sheet about said indicia substantially to the same peripheral dimensions as said disc, said second means severing said sheet about said axis.

30. A toy decorative disc fabrication device comprising:
first means including a housing having an axis, said housing for releasably receiving and locating a circular disc of a given diameter and surface area normal to and on the axis at a predetermined location at the housing;
said first means being arranged for receiving a sheet with indicia on a surface thereof in overlying movable relation relative to the received disc at said predetermined location, said sheet surface having an area greater than that of the disc;
second means including a transparent knob coupled to the first means, said knob for axial displacement along the axis and rotatable displacement about the axis for enabling visual observation of the sheet at said predetermined location to permit manual alignment of the indicia with said received disc; and
third means including severing means coupled to the knob for manually severing the aligned sheet while in said overlying relation in response to said axial and rotatable displacement of the knob.

31. A toy decorative disc fabrication device comprising:
a housing having a cavity and an opening in communication with the cavity and ambient atmosphere;
first means secured to the housing for releasably receiving a disc of a given diameter and surface area, said first means being arranged for locating the disc on an axis at a predetermined location relative to the housing in said cavity;

said opening for receiving a sheet with indicia thereon in overlying movable relation relative to the received disc at said predetermined location in said cavity, said sheet having a broad surface area greater than that of the disc;

second means secured to the housing for enabling visual observation of the received disc and the indicia on said received sheet along said axis and for enabling alignment of the indicia with the means for receiving the disc at said predetermined location; and third means secured to the housing for severing the sheet about said aligned indicia;

said predetermined location lying on said axis substantially at the center of said received disc, said third means including at least one blade rotatably secured to the housing for rotation about said axis and having a cutting radius substantially the same as the radius of said received disc.

32. A toy decorative disc fabrication device comprising:

first means including;
- a housing defining a cavity in communication with ambient atmosphere through an opening in the housing; and
- a tray movably secured to the housing for selective displacement into and out of the cavity from the ambient atmosphere through said opening, said housing and tray being arranged for releasably receiving and locating a circular disc of a given diameter and surface area at a predetermined location substantially centrally on an axis normal to the disc in said cavity, said housing and tray being arranged for receiving a sheet with indicia on a surface thereof in overlying movable relation relative to the received disc at said predetermined location, said sheet surface having an area greater than that of the disc;

second means coupled to the first means for enabling visual observation of the sheet at said predetermined location to permit manual alignment of the indicia with said received disc; and third means coupled to the first means for manually severing the aligned sheet while in said overlying relation, said third means including at least one blade rotatably secured to the housing for rotation about the axis.

* * * * *